(12) United States Patent
Gould et al.

(10) Patent No.: US 10,868,691 B2
(45) Date of Patent: Dec. 15, 2020

(54) SYSTEMS, METHODS, APPARATUS AND MEDIA FOR USE IN ASSOCIATION WITH SCHEDULING

(71) Applicant: iDevices, LLC, Avon, CT (US)

(72) Inventors: Daniel Gould, East Hampton, CT (US); Matthew Harrison, New Hartford, CT (US)

(73) Assignee: IDEVICES, LLC, Avon, CT (US)

( * ) Notice: Subject to any disclaimer, the term of this patent is extended or adjusted under 35 U.S.C. 154(b) by 0 days.

(21) Appl. No.: 16/032,561

(22) Filed: Jul. 11, 2018

(65) Prior Publication Data

US 2019/0036725 A1  Jan. 31, 2019

Related U.S. Application Data

(60) Provisional application No. 62/538,873, filed on Jul. 31, 2017.

(51) Int. Cl.
*H04L 12/28* (2006.01)
*H04L 29/08* (2006.01)

(52) U.S. Cl.
CPC ........ *H04L 12/2823* (2013.01); *H04L 67/125* (2013.01)

(58) Field of Classification Search
CPC .................................................. H04L 12/2823
See application file for complete search history.

(56) References Cited

U.S. PATENT DOCUMENTS

| | | | | |
|---|---|---|---|---|
| 2009/0099988 A1* | 4/2009 | Stokes | .................... | G06F 15/16 706/20 |
| 2010/0217837 A1 | 8/2010 | Ansari et al. | | |
| 2014/0267931 A1* | 9/2014 | Gilson | ................. | H04N 5/4403 348/734 |
| 2016/0044447 A1 | 2/2016 | Tetreault et al. | | |
| 2016/0209899 A1 | 7/2016 | Brantner et al. | | |
| 2016/0245538 A1 | 8/2016 | Amer et al. | | |
| 2017/0031536 A1* | 2/2017 | Shah | ...................... | G06Q 50/01 |
| 2017/0364239 A1 | 12/2017 | Gould et al. | | |

OTHER PUBLICATIONS

PCT International Search Report and Written Opinion for corresponding PCT Application No. PCT/US2018/041624, dated Oct. 4, 2018, 6 pages.
PCT International Preliminary Report on Patentability for corresponding PCT Application No. PCT/US2018/041624, dated Feb. 13, 2020, 5 pages.

* cited by examiner

*Primary Examiner* — Samina F Choudhry
(74) *Attorney, Agent, or Firm* — Michael Best & Friedrich, LLP

(57) ABSTRACT

In at least one aspect, a method comprises: receiving information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day; determining a chronological ordering that indicates a chronological order in which at least a subset of the plurality of scheduled actions are scheduled to be carried out; generating a view based at least in part on the chronological ordering; and displaying the generated view. Such methods may be performed or implemented by various devices, apparatuses and/or systems.

18 Claims, 11 Drawing Sheets

200

202

| Name | DAY | TIME | SCENE (ACTION) | Recurrance | |
|---|---|---|---|---|---|
| Name | Sunday | 2:30 PM | STUDYING | Sat | 212 |
| Name | Sunday | 7:00 AM | WAKE UP | Sat | 214 |
| Name | Sunday | 7:00 AM | GET READY | Sat | 216 |
| Name | Monday | 6:00 AM | WAKE UP | Tu,W,Th,F | 218 |

204

| Name | DAY | TIME | SCENE (ACTION) | Recurrance | |
|---|---|---|---|---|---|
| Name | Sunday | 10:30 PM | Bedroom Lamp Night Light ON | M,Tu,W,Th | 222 |
| Name | Monday | 6:00 AM | Bedroom Lamp POWER ON | Tu,W,Th,F | 224 |
| Name | Sunday | 8:00 AM | Bedroom Lamp POWER OFF | Tu,W,Th,F | 226 |
| Name | Monday | 7:00 AM | Bedroom Lamp POWER ON | | 228 |

206

| Name | DAY | TIME | SCENE (ACTION) | Recurrance | |
|---|---|---|---|---|---|
| Name | Monday | 6:00 AM | Side Lamp POWER ON | Tu,W,Th,F | 232 |
| Name | Monday | 8:00 AM | Side Lamp POWER OFF | Tu,W,Th,F | 234 |
| Name | Sunday | 10:30 PM | Side Lamp POWER OFF | M,Tu,W,Th | 236 |
| Name | Friday | 11:30 PM | Side Lamp POWER OFF | Sat | 238 |

FIG. 2

SYSTEMS, METHODS, APPARATUS AND MEDIA FOR USE IN ASSOCIATION WITH SCHEDULING

PRIORITY CLAIM

The present application claims the benefit of priority of U.S. Provisional Patent Application Ser. No. 62/538,873, titled "SYSTEMS, METHODS, APPARATUS AND MEDIA FOR USE IN ASSOCIATION WITH SCHEDULING," filed Jul. 31, 2017, which is incorporated herein by reference.

FIELD OF THE DISCLOSURE

The present disclosure relates generally to computing devices that permit control of other devices, and more particularly to computing devices that allow a user to schedule actions to be carried out and/or systems, methods, apparatus, and/or media for use in association with scheduled actions.

BACKGROUND INFORMATION

Many computing devices permit control of other devices. Such computing devices often allow a user to schedule actions that a user wishes to have carried out with respect to one or more of the other devices. For example, a user may request that a thermostat be set to a particular temperature at a particular time on a particular day of the week.

SUMMARY

The inventors have recognized various deficiencies in known control systems. For example, information supplied by a user in the course of scheduling actions may be stored as data entries that are distributed across multiple tables in multiple locations. The order of such entries may reflect the order in which the actions are defined, not the order in which the actions are scheduled to be carried out. In view at least thereof, the order of the entries in the tables do not provide information from which a user can easily recognize the order in which the actions are scheduled to be carried out. The distribution of the entries across multiple tables also makes it difficult for a user to easily recognize the order that the actions are scheduled to be carried out. In addition, the user interface may be constructed or organized in a manner so that the scheduled actions are not viewable in the same view, but rather, viewed only as part of a particular category or categories defined by other criteria than time or order. That is, the scheduled actions are viewable only on different screens or windows from each other. This too, makes it difficult for a user to recognize the order or schedule of the actions. It is an object of at least some embodiments to address one or more of the above-described deficiencies.

In at least one aspect, a method comprises: receiving, in a computing device, information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day; determining, by a computing device, a chronological ordering that indicates a chronological order in which at least a subset of the plurality of scheduled actions are scheduled to be carried out; generating, by a computing device, a view based at least in part on the chronological ordering; and displaying, in a user interface, the generated view. In at least some embodiments, the method helps a user to more easily recognize an order in which actions are scheduled to be carried out.

In another aspect, a non-transitory computer-readable medium has computer-readable instructions stored thereon that if executed by a computing system, result in a method comprising: receiving, in a computing device, information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day; determining, by a computing device, a chronological ordering that indicates a chronological order in which at least a subset of the plurality of scheduled actions are scheduled to be carried out; generating, by a computing device, a view based at least in part on the chronological ordering; and displaying, in a user interface, the generated view.

In another aspect, an apparatus comprises: a computing device configured to: receive information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day; determine a chronological ordering that indicates a chronological order in which at least a subset of the plurality of scheduled actions are scheduled to be carried out; generate a view based at least in part on the chronological ordering; and display the generated view.

In at least some embodiments, each one of the plurality of scheduled actions in the subset is represented by an entry in the chronological ordering that is located at a position in the chronological ordering that is based at least in part on the scheduled time of day defined by the one of the plurality of scheduled actions. In at least some embodiments, the subset includes each of the plurality of scheduled actions that are scheduled to be carried out on a current day. In at least some embodiments, the view includes a chronological ordering indicating a chronologic order in which each of the plurality of scheduled actions that are scheduled to be carried out on a current day are scheduled to be carried out. In at least some embodiments, the view includes a graphical tool activatable by a user to request display of a chronological ordering indicating a chronologic order in which each of the plurality of scheduled actions scheduled to be carried out on a next day are scheduled to be carried out. In at least some embodiments, the subset includes scheduled actions that are scheduled scenes and scheduled actions that are not scheduled scenes.

One advantage of certain embodiments is that a set or subset of actions scheduled to be performed can be conveyed to a user in chronological order. Another advantage of certain embodiments is that a user can select or define what actions or subset of actions are conveyed in chronological order, using one or more criteria or parameters. Other objects, features and/or advantages will become apparent in view of the following detailed description of the embodiments and the accompanying drawings. However, while various objects, features and/or advantages are described in this Summary and/or will become apparent in view of the following detailed description and accompanying drawings, it should be understood that such objects, features and/or advantages are not required in all aspects and embodiments.

This Summary is not exhaustive of the scope of the present aspects and embodiments. Thus, while certain aspects and embodiments have been presented and/or outlined in this Summary, it should be understood that the present aspects and embodiments are not limited to the aspects and embodiments in this Summary. Indeed, other aspects and embodiments, which may be similar to and/or different from, the aspects and embodiments presented in this Summary, will be apparent from the description, illustrations and/or claims, which follow. Any aspects and embodiments that are described in this Summary and do not appear in the claims that follow are preserved for later presentation in this application or in one or more continuation patent applications. Any aspects and embodiments that are not described in this Summary and do not appear in the claims that follow are also preserved for later presentation or in one or more continuation patent applications.

BRIEF DESCRIPTION OF THE DRAWINGS

The foregoing features of the disclosure will be apparent from the following Detailed Description, taken in connection with the accompanying drawings, in which:

FIG. 2 is a graphical representation of information that may be stored in association with actions that have been scheduled by a user;

DETAILED DESCRIPTION

At least some aspects and embodiments disclosed herein relate to systems, methods, apparatus, and/or computer readable media for use in generating views that provide information in regard to actions that have been scheduled with respect to one or more objects that may be remotely controlled by or via a computer program or application.

Figure 1:
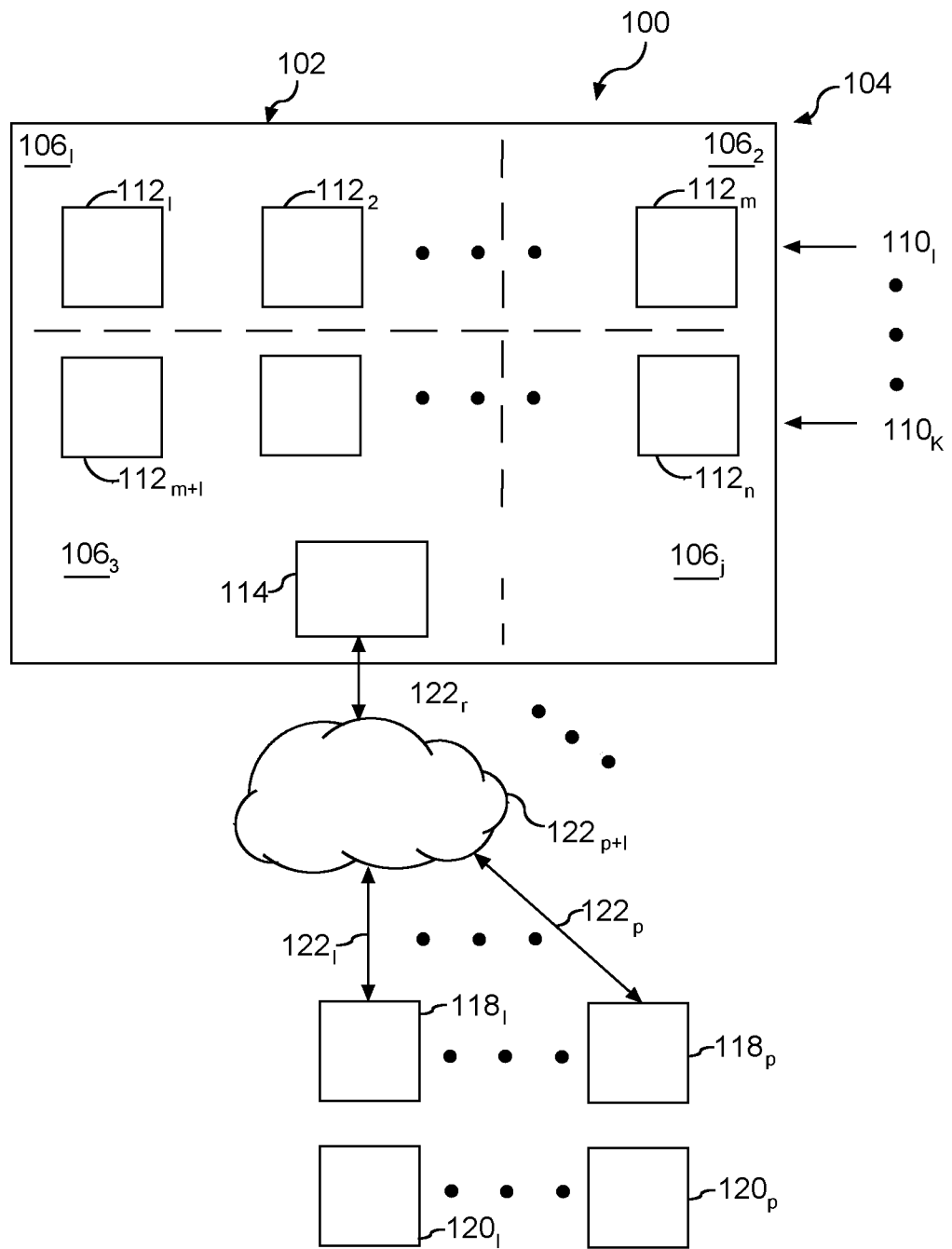
FIG. 1 is a block diagram of a system in which one or more devices located at a remote or other location separate from a computer program or application that may control such device(s)

FIG. 1 is a block diagram of a system 100 in which one or more devices located at one or more locations (remote or otherwise) may be controlled via a computer program or application separate from the device, and in which at least some aspects and embodiments disclosed herein may be used. Referring to FIG. 1, in accordance with at least some embodiments, the system 100 may include one or more buildings, e.g., building 102, or other type(s) of site(s), located in one or more locations, e.g., location 104. Each building, e.g., 102, may include one or more rooms, e.g., rooms $106_1$-$106_j$, disposed or otherwise located on one or more floors, e.g., floors $110_1$-$110_k$, and/or in one or more zones of the building. The system further includes one or more devices to be controlled, e.g., devices $112_1$-$112_n$, which may be disposed or otherwise located in one or more of the rooms, floors and/or zones. One or more wireless access points, e.g., wireless access point 114, or other communication device(s), may also be disposed or otherwise located in one or more of the rooms, floors and/or zones, and may be in wireless communication with, or otherwise communicatively coupled to or paired with, one or more of the device(s) to be controlled.

The system 100 may further include one or more computing devices, e.g., computing devices $118_1$-$118_p$, which may be operated by one or more users, e.g., users $120_1$-$120_p$, and used to control one or more of devices $112_1$-$112_p$. In at least some embodiments, each of the one or more computing device(s) may include one or more processors, one or more input devices and/or one or more output devices. The input devices may include on or more of a keyboard, a touchscreen, a microphone (e.g., use of voice recognition), data port or other data connection (e.g., wired or wireless), or any other mechanism, apparatus or means, now existing or later developed, for inputting information into the computing devices $118_1$-$118_p$, e.g., by users $120_1$-$120_p$. The output devices may be one or more of a viewscreen, speaker, tactile output device, data port or other data connection (e.g., wired or wireless), or any other mechanism, apparatus or means, now existing or later developed, for outputting information from the computing devices $118_1$-$118_p$, e.g., to users $120_1$-$120_p$. One or more of the processor(s) in a given computing device may execute one or more programs or applications (also referred to herein as an "app") to perform one or more tasks. One or more of such tasks may be associated with and/or include control of one or more of devices $112_1$-$112_n$.

In at least some embodiments, one or more of the computing device(s) communicate with one or more of the one or more devices $112_1$-$112_n$ via one or more of the one or more wireless access points, e.g., wireless access point 114, (or other communication device(s)). One or more of the computing device(s) may be located in, or sufficiently close to, a building, e.g., building 102, or other type of site, to allow such one or more computing device to communicate directly with one or more wireless access point(s) (or other communication device(s)) and/or to allow such one or more computing device to communicate directly with one or more device(s) to be controlled. One or more of the computing devices may be coupled to one or more of the wireless access point(s) (or other communication device(s)), via one or more communication links, e.g., communication links $122_1$-$122_r$, one or more of which may define a network (or portion(s) thereof), e.g., a local area network or a wide area network, e.g., the Internet.

One or more of the programs or applications executed by one or more of the computing devices, e.g., computing devices $118_1$-$118_p$, may allow a user to schedule one or more actions that are to be carried out with respect to one or more of the devices to be controlled, e.g., devices $112_1$-$112_n$. For example, in at least some embodiments, a user may request that a thermostat (or other device) be set to a particular temperature (or other operating condition) at a particular time on one or more days (e.g., one or more days of the week). An action that is scheduled to be carried out with respect to a device is referred to herein as a "scheduled action."

In at least some embodiments, a user may schedule or otherwise define a scheduled action by providing information that defines at least in part: (i) a device to be controlled (ii) an action to be carried out on such device, (iii) a scheduled time to initiate or otherwise carry out (perform) the action, and (iv) a scheduled day (or days) to initiate or otherwise carry out the action. In at least some embodiments, the user may provide such information via one or more graphical tools in a graphical user interface provided by one of the mobile computing devices and/or in any other manner enabled by the system 100. In at least some embodiments, a user may schedule an action using the iDevices Connected® app produced by iDevices of Avon, Conn.

In at least some embodiments, a user may define a "scene" where one or more actions are to be carried out on one or more devices. For example, in at least some embodiments, a scene may specify that a first device (e.g., a thermostat) is to be set to a particular operating condition (e.g., temperature) and that a second device is to be set to a particular operating condition. Once defined, a scene may be scheduled in a manner similar to that in which an action to be carried out on a device may be scheduled. For example, a scheduled scene may specify that the scene is scheduled to be initiated or otherwise carried out at a particular time on a particular day (or days). A scene that is scheduled to be carried out is also referred to herein as "scheduled action." In at least some embodiments, scenes may be defined and scheduled using a HomeKit® framework (by Apple), and scheduled actions that do not involve such scenes and scheduled scenes are defined independently of a HomeKit® framework.

The information that is supplied by a user in association with scheduling or otherwise defining one or more scheduled actions (one or more of which may be a scheduled scene) may be stored in any manner(s) (e.g., location(s), configuration(s), etc.). However, in at least some embodiments, the manner(s) in which information for a given scheduled action is stored depends on the manner in which the scheduled action was defined. For example, in at least some embodiments, each scheduled action that is scheduled or otherwise defined using a HomeKit® framework is stored in (and/or by) one or more servers that support the HomeKit® application program interface (API), and each scheduled action that is scheduled or otherwise defined independently of a HomeKit® framework is stored in (and/or by) a device, e.g., one of devices $112_1$-$112_n$, to be controlled by the scheduled action. Consequently, the information supplied by a user in association with scheduling or otherwise defining a plurality of scheduled actions is distributed among multiple storage locations.

FIG. 2 is a graphical representation 200 of information that has been stored in association with a plurality of scheduled actions, in accordance with at least some embodiments. Referring to FIG. 2, in accordance with at least some embodiments, the information is shown distributed between a plurality of tables, e.g., tables 202-206, each of which may be stored in the same or a different location. For example, table 202 may be associated with scheduled actions that involve scenes defined using a HomeKit® framework and may be stored in (and/or by) one or more servers that support the HomeKit® API. Table 204 may be associated with scheduled actions that control a first device, e.g., a Bedroom Lamp, (but not as part of a scene) and may be stored in (and/or by) such first device. Table 206 may be associated with scheduled actions that control a second device, e.g., a Side Lamp, (but not as part of a scene) and may be stored in (and/or by) such second device.

Each table includes a plurality of entries. For example, table 202 includes entries 212-218. Table 204 includes entries 222-228. Table 206 includes entries 232-238. Each entry is associated with a respective action that has been scheduled and indicates the following: (i) a name (or other identifier) associated a device to be controlled and an action to be carried out on the device, or a name (or other identifier) associated a scene that in turn specifies a device to be controlled and an action to be carried out on the device), (ii) a scheduled time to initiate or otherwise carry out the action, and (iii) a scheduled day to initiate or otherwise carry out the action and (iv) one or more other scheduled days to initiate or otherwise carry out the action (sometimes referred to herein as recurrence).

For example, a first entry 212 in the table 202 indicates that a first scene, i.e., a scene named or otherwise associated with the identifier "STUDYING," is scheduled to be initiated or otherwise carried out on Sunday at 2:30 PM. The entry 212 further indicates that the same scene is scheduled to be initiated or otherwise carried out at the same time on Saturday, i.e., Saturday at 2:30 PM. A second entry 214 in the table 202 indicates that a second scene, i.e., a scene named or otherwise associated with the identifier "WAKE UP," is scheduled to be initiated or otherwise carried out on Sunday at 7:00 AM. The entry 214 further indicates that the same scene is scheduled to be initiated or otherwise carried out at the same time on Saturday, i.e., Saturday at 7:00 AM. A third entry 216 in the table 202 indicates that a third scene, i.e., a scene named or otherwise associated with the identifier "GET READY," is also scheduled to be initiated or otherwise carried out on Sunday at 7:00 AM. The entry 216 further indicates that the same scene is scheduled to be initiated or otherwise carried out at the same time on Saturday, i.e., Saturday at 7:00 AM. A fourth entry 218 in the table 202 indicates that a fourth scene, which in the illustrated embodiment is the "WAKE UP" scene also listed in entry 224 but can be a different scene, is scheduled to be initiated or otherwise carried out on Monday at 6:00 AM. The entry 218 further indicates that this same scene is scheduled to be initiated or otherwise carried out at the same time on Tuesday through Friday, i.e., Tuesday at 6:00 AM, Wednesday at 6:00 AM, Thursday at 6:00 AM and Friday at 6:00 AM.

A first entry 222 in the table 204 indicates that a first action, "Bedroom Lamp Night Light ON," is scheduled to be initiated or otherwise carried out on Sunday at 10:30 PM. The entry 222 further indicates that the same action is scheduled to be initiated or otherwise carried out at the same time on Monday through Thursday, i.e., Monday at 10:30 PM, Tuesday at 10:30 PM, Wednesday at 10:30 PM and Thursday at 10:30 PM. A second entry 224 in the table 204 indicates that a second action, "Bedroom Lamp POWER ON," is scheduled to be initiated or otherwise carried out on Monday at 6:00 AM. The entry 224 further indicates that the same action is scheduled to be initiated or otherwise carried out at the same time on Tuesday through Friday, i.e., Tuesday at 6:00 AM, Wednesday at 6:00 AM, Thursday at 6:00 AM and Friday at 6:00 AM. A third entry 226 in the table 204 indicates that a third action, "Bedroom Lamp POWER OFF," is scheduled to be initiated or otherwise carried out on Monday at 8:00 AM. The entry 226 further indicates that the same action is scheduled to be initiated or otherwise carried out at the same time on Tuesday through Friday, i.e., Tuesday at 8:00 AM, Wednesday at 8:00 AM, Thursday at 8:00 AM and Friday at 8:00 AM. A fourth entry 228 in the table 204 indicates that a fourth action, "Bedroom Lamp POWER ON," is scheduled to be initiated or otherwise carried out on Sunday at 7:00 AM. The entry 228 further indicates that this scheduled action does not recur on any other days of the week.

Table 206 contains entries 232, 234, 236, 238 that indicate scheduled actions in a similar manner as entries in tables 202 and 204.

In accordance with at least some embodiments, the order of the entries in the tables reflects the order that the actions in each table were defined or created, e.g., by a user, not the order in which the actions are scheduled to be carried out. For example, in accordance with at least some embodiments, new entries to each table may be added at the bottom thereof as the new entries are defined. In view thereof, the tables themselves do not provide a user with information from which a user can easily recognize a time sequence in which the actions are scheduled to be carried out. The distribution of the information across multiple tables can also make it more difficult for a user to easily recognize a time sequence in which the actions are scheduled to be carried out.

Figure 3:
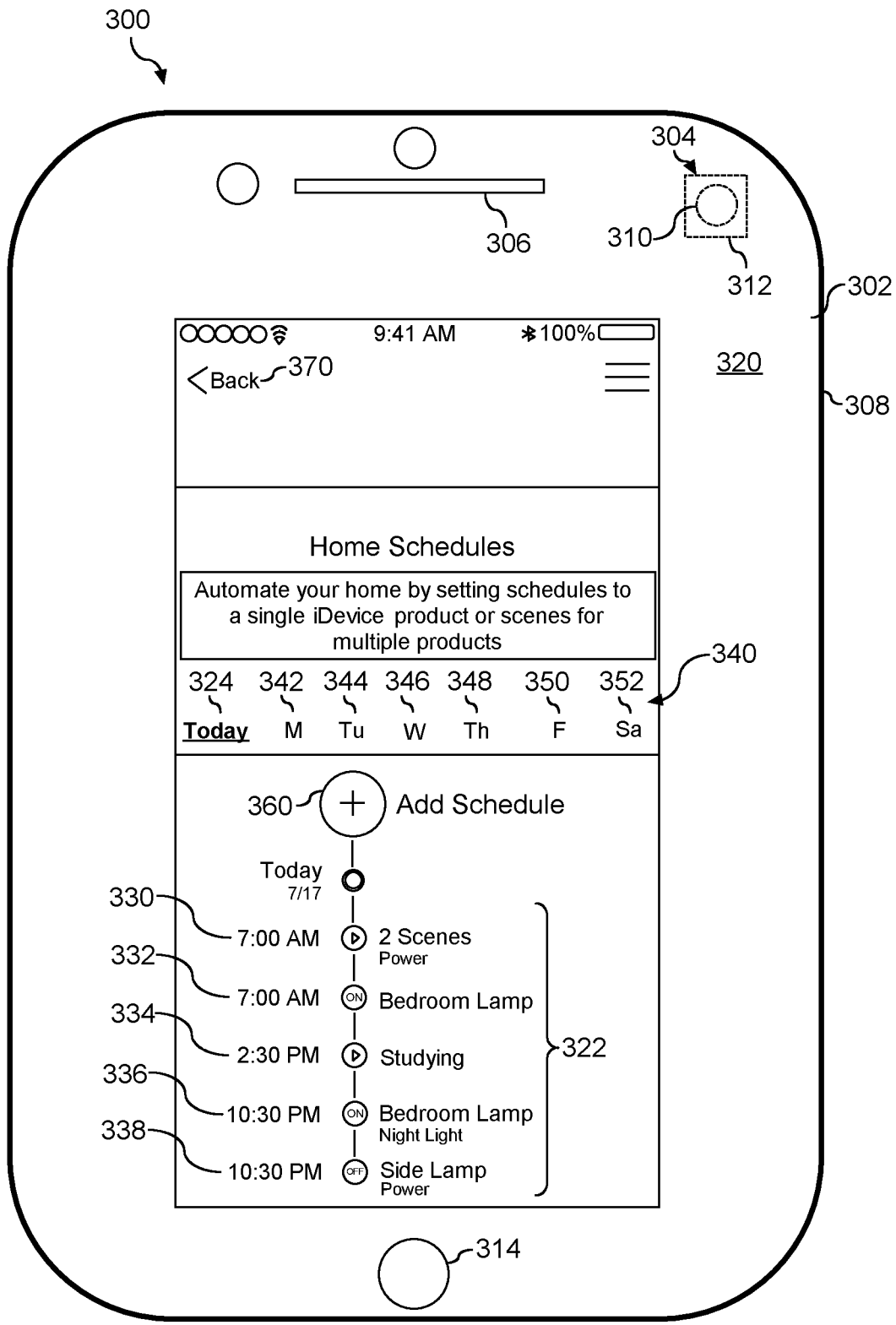
FIG. 3 is a schematic representation of a computing device displaying a view in a graphical user interface.

In at least some embodiments, a user is provided with a view or views that show a timeline or other information indicative of a chronological order in which scheduled actions (or subset(s) thereof) are scheduled to be carried out. FIG. 3 is a schematic representation of a mobile computing device 300 that displays a view and/or a sequence of views, e.g., in a graphical user interface, in accordance with at least some embodiments. As will be further described below, in accordance with at least some embodiments, one or more of the views may include a timeline or other information indicative of a chronological order in which the scheduled actions (or subset(s) thereof) are scheduled to be performed. In at least some embodiments, the view and/or sequence of views may be provided upon and/or after initial execution of a program or application for use in controlling one or more devices in one or more locations. However, the illustrated views are not limited to use upon and/or after an initial execution of a program or application for use in controlling one or more devices in one or more locations.

The disclosed process is not limited to the sequence(s) shown. Rather, in various embodiments, the process may be performed in any order that is practicable and/or desirable.

In at least some embodiments, one or more of the views, or features or other portions thereof, may be used without one or more other ones of the views, or features or portions thereof. In at least some embodiments, one or more of the views, or portions thereof, (and/or any other views disclosed herein) may be used in combination with one or more other views, or portions thereof.

In at least some embodiments, the computing device 300 may be the same as and/or similar to one or more of the one or more computing devices, e.g., computing devices $118_1$-$118_p$. However, the computing device 300 may be any suitable computing device. Referring to FIG. 3, in accordance with at least some embodiments, the mobile computing device 300 may include a display 302, a camera 304, a speaker 306 and/or a case 308 that surrounds and/or supports (directly and/or indirectly) the display 302, the camera 304 and/or the speaker 306. The camera 304 may include an aperture 310 and an image sensor 312. The mobile computing device 300 may include, or may further include a microphone (not shown) and an on/off button 314 and/or other type of control that can be activated and/or otherwise used by a user to turn the computing device 300 on and/or off.

The display 302 as illustrated is displaying a view 320 that includes a chronological ordering 322 indicating a chronologic order in which those of the scheduled actions in FIG. 2 scheduled to be carried out on a current day (which in the illustrated embodiment, is a Sunday) are scheduled to be carried out (i.e., a chronologic order that a subset of the scheduled actions shown in FIG. 2 are scheduled to be carried out). In at least some embodiments, the view 320 may be displayed in response, at least in part, to receiving a request from a user for a chronological ordering of all scheduled actions that are associated with a home or other building (sometimes referred to herein as a "home schedule"). In at least some embodiments, the user may provide such a request by activating (e.g., by a finger gesture, voice request, etc.) a graphical tool in a prior/other view (not shown) provided by the graphical user interface and/or in any other manner enabled by the system 100. In at least some embodiments, the mobile computing device 300 may respond to the request, at least in part, by generating a chronological ordering of all scheduled actions, identifying a portion of the generated chronological ordering that is scheduled to be carried out on a current day, and generating a view that includes and/or is based at least in part on such portion of the generated chronological ordering. In at least some embodiments, a user may identify or select a portion or subset of scheduled actions that the user wishes to view a chronologic order, e.g., one or more of the day, time period, building, room, etc. In addition, though the illustrated embodiment conveys the chronologic order in a view, e.g., via a graphical interface, the information may be conveyed to the user by any suitable and/or desired manner, e.g., audibly, such as via the speaker 306. The view may include an indication 324 (e.g., "Today") that the displayed chronological ordering 322 is associated with the current day.

The chronological ordering 322 may include a plurality of entries, e.g., entries 330-338. In the illustrated embodiment, a first entry 330 indicates that two scenes are scheduled to be carried out at 7:00 AM. In accordance with at least some embodiments, if multiple scenes are scheduled for a same time on a same day, the chronological ordering may represent those multiple scenes by a single entry that indicates the number of scenes that are scheduled for that time on that day. A second entry 332 indicates that an action, "Bedroom Lamp POWER ON," is also scheduled to be carried out at 7:00 AM. In accordance with at least some embodiments, if a scheduled action does not involve a scene, the chronological ordering may represent the scheduled action by an entry that includes a name or other identifier associated with a device and an action to be carried out on such device. A third entry 334 indicates that an action, i.e., a scene named or otherwise associated with the identifier "STUDYING," is scheduled to be carried out at 2:30 PM. In accordance with at least some embodiments, if a single scene (rather than multiple scenes) is scheduled for a particular time on particular day, the chronological ordering may represent that scene by an entry that includes a name or other identifier associated with the scene. A fourth entry 336 indicates that an action, "Bedroom Lamp Night Light ON," is scheduled to be carried out at 10:30 PM. A fifth entry 338 indicates that an action, "Side Lamp Power OFF," is scheduled to be carried out at 10:30 PM.

The view 320 may further include a graphical tool, e.g., graphical tool 340, that may be activated (e.g., by a finger tap) by a user to request display of a chronological ordering indicating a chronologic order in which those of the scheduled actions in FIG. 2 that are scheduled to be carried out on another day are scheduled to be carried out. In the illustrated embodiment, the graphical tool 340 includes graphical elements 342 (e.g., "M"), 344 (e.g., "Tu"), 346 (e.g., "W"), 348

(e.g., "Th"), 350 (e.g., "F") and 352 (e.g., "Sa") representing the days of the week (in the illustrated embodiment, the current day is Sunday). Graphical element 342 (e.g., "M") may be activated to request display of a chronologic order in which those of the scheduled actions that are scheduled to be carried out on Monday are scheduled to be carried out. In at least some embodiments, the mobile computing device 300 may respond to the request, at least in part, by identifying a portion of the previously generated chronological ordering that is scheduled to be carried out on Monday, and generating a view that includes and/or is based at least in part on such portion of the generated chronological ordering. Graphical element 344 (e.g., "Tu") may be activated to request display of a chronologic order in which those of the scheduled actions that are scheduled to be carried out on Tuesday are scheduled to be carried out. In at least some embodiments, the mobile computing device 300 may respond to the request, at least in part, by identifying a portion of the previously generated chronological ordering that is scheduled to be carried out on Tuesday, and generating a view that includes and/or is based at least in part on such portion of the generated chronological ordering. Graphical elements 346, 348, 350 and 352 may be activated and responded to by the computing device 300 in a similar manner. It should be understood, though, that in other embodiments, the graphical tool 340, or another graphical tool, may include graphical elements other than days of the week, e.g., buildings, floors, rooms, etc., so that the user may activate the computing device 300 to convey a different chronological order or portion of a chronological order of scheduled actions.

In at least some embodiments, the view 320 may include one or more graphical tools that may be activated (e.g., by a finger tap) by a user to initiate navigation to a view that: (i) provides additional information in regard to one or more of the scheduled actions represented in the chronological ordering 322, (ii) allows the user to edit one or more of the scheduled actions, (iii) provides additional information in regard to one or more of the devices to be controlled by one or more of the scheduled actions and/or (iv) allows the user to control one or more of the devices, e.g., in real time or near real time and without the need to schedule an action. In at least some embodiments, each entry, e.g., entries 330-338, in the chronological ordering 322 may include such a graphical tool and may be used to initiate such navigation (sometimes referred to herein as "drill down"). For example, in at least some embodiments, entry 330 may include a graphical tool that may be activated (e.g., by a finger tap) by a user to request a view that includes further information in regard to the two scenes represented by entry 330. The latter view (not shown) may itself include one or more graphical tools (not shown) that may be activated (e.g., by a finger tap) by a user to request a view that includes further information in regard to one of the two scenes, e.g., the definition of the scene. Other drill down embodiments should be understood by those of ordinary skill in the art.

The view 320 may include a graphical tool, e.g., graphical tool 360, that may be activated (e.g., by a finger tap) by a user to initiate a process that allows the user to schedule or otherwise define actions, e.g., add additional actions, revise existing actions, delete existing actions, etc. The view 320 may further include a graphical tool, e.g., graphical tool 370, which may be activated (e.g., by a finger tap) by a user to navigate to a prior or different view in the graphical user interface. In the illustrated embodiment, the chronological ordering 322 has the form of a timeline. It should be appreciated by those of ordinary skill in the art, however, that the chronological ordering 322 (and/or any other chronological ordering disclosed herein) may comprise or further comprise any other type(s) of timeline(s) and/or any other type(s) of information indicative of a chronological order, e.g., a table.

In at least some embodiments, the mobile computing device 300 may include a chronological ordering generator to generate the chronological ordering and a day picker to identify the portion of the generated chronological ordering that is scheduled to be carried out on the current day (and/or any other day). The former may be in the form of an application or program present on the computing device 300. The latter may be derived from a source indicating the current day and/or time, e.g., a clock function or application on the computing device 300, a website on the Internet (for example, NIST official time), etc.

At least some embodiments provide the user with the ability to request a chronological ordering of one or more scheduled actions that are associated with a specific device, e.g., a specific desk lamp, including any scenes that include a scheduled action for the specific device, or a specific building, location, floor, or room. Implementing such should be understood by those of ordinary skill in the art.

Figure 4A:
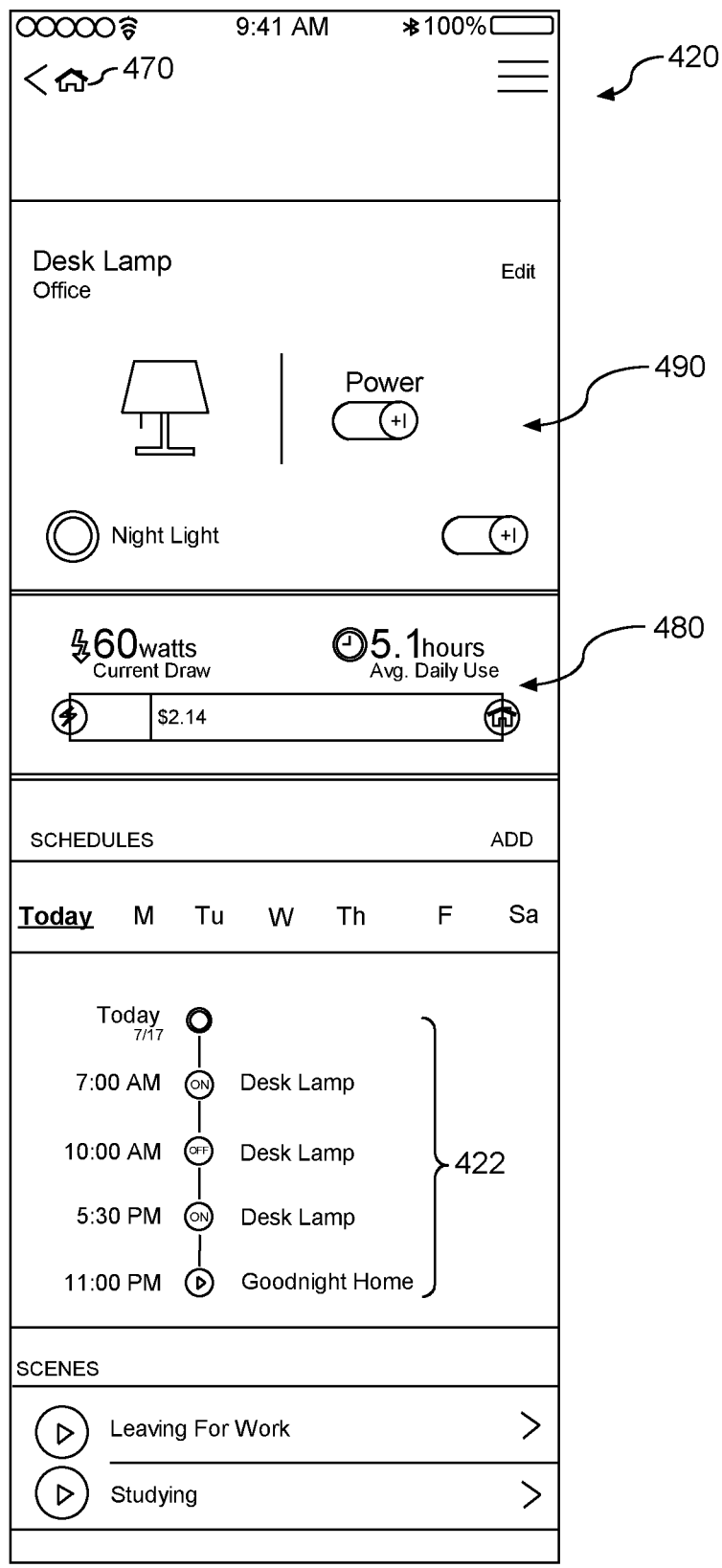
FIG. 4A is a schematic representation of a view in a graphical user interface.
Figure 4B:
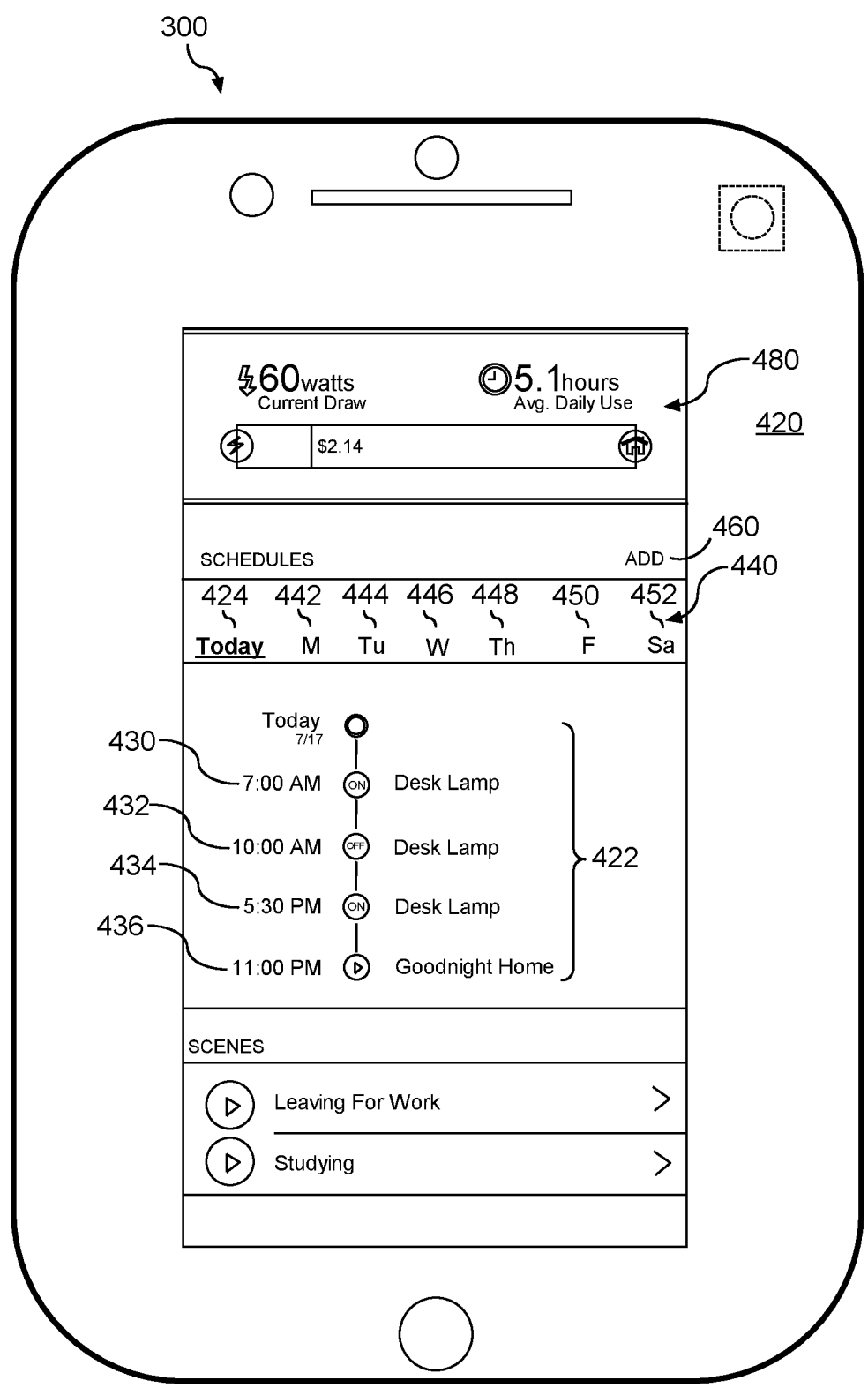
FIG. 4B is a schematic representation of a computing device displaying a portion of the view in FIG. 4A.
Figure 4C:
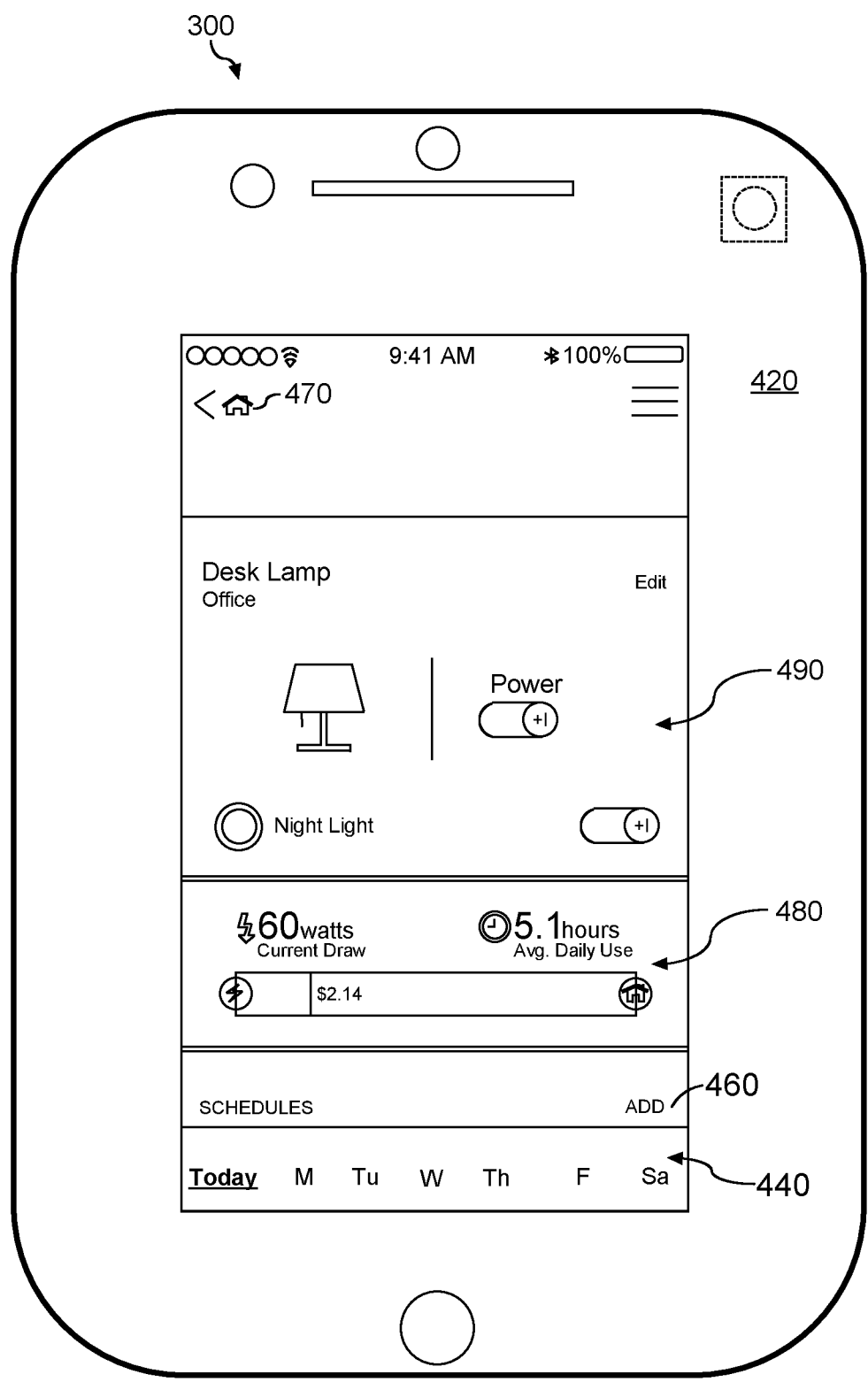
FIG. 4C is a schematic representation of a computing device displaying another portion of the view in FIG. 4A.

FIG. 4A shows a view 420 that includes a chronological ordering 422 indicating a chronologic order in which those of a plurality of scheduled actions that are associated with a specific device (e.g., identified by the name or identifier "Desk Lamp") and scheduled to be carried out on a current day (which in the illustrated embodiment, is a Sunday), i.e., a chronologic order in which a subset of a plurality of scheduled actions are scheduled to be carried out. FIG. 4B shows the mobile computing device 300 displaying a portion of the view 420. FIG. 4C shows the mobile computing device 300 displaying another portion of the view 420.

In at least some embodiments, the view 420 (or portion(s) thereof) may be displayed in response, at least in part, to receiving a request from a user for a chronological ordering of scheduled actions associated with a specific device (e.g., identified by the name or identifier "Desk Lamp"). In at least some embodiments, the user may provide such a request by activating (e.g., by a finger gesture) a graphical tool in a prior or other view (not shown) provided by the graphical user interface and/or in any other manner enabled by the system 100. In at least some embodiments, the mobile computing device 300 may respond to the request, at least in part, by generating a chronological ordering of all scheduled actions that are associated with the specific device (e.g., identified by the name or identifier "Desk Lamp"), identifying a portion of the generated chronological ordering that is scheduled to be carried out on a current day, and generating a view that includes and/or is based at least in part on such portion of the generated chronological ordering. The view may include an indication 424 (e.g., "Today") that the displayed chronological ordering 422 is associated with the current day.

The chronological ordering 422 may include a plurality of entries, e.g., entries 430-436. In the illustrated embodiment, a first entry 430 indicates that an action, "Desk Lamp ON," is scheduled to be carried out at 7:00 AM. In accordance with at least some embodiments, if a scheduled action does not involve a scene, the chronological ordering may represent the scheduled action by an entry that includes a name or other identifier that is associated with a device and an action to be carried out on such device. A second entry 432 indicates that an action, "Desk Lamp OFF," is scheduled to be carried out at 10:00 AM. A third entry 434 indicates that an action, "Desk Lamp ON," is scheduled to be carried out at 5:30 PM. A fourth entry 436 indicates that an action, a scene named or otherwise associated with the identifier "GOODNIGHT HOME," which in turn defines an action for the device identified by the name or identifier "Desk Lamp", is scheduled to be carried out at 11:00 PM. In accordance with at least some embodiments, if a single scene (rather than multiple scenes) that defines an action for the specific device is scheduled for a particular time on particular day, the chronological ordering may represent that scene by an entry that includes a name or other identifier associated with the scene. If on the other hand, multiple scenes include an action for the specific device and are scheduled for a same time on a same day, the chronological ordering may represent those multiple scenes by a single entry that indicates the number of scenes that are scheduled for that time on that day. In some embodiments, the user may drill down into the scenes in a manner as discussed above, and in further embodiments, may drill down further into the schedules action(s) for the device in an individual scene.

The view 420 may further include a graphical tool, e.g., graphical tool 440, which may be activated (e.g., by a finger tap) by a user to request display of a chronological ordering indicating a chronologic order in which actions that are associated with the specific device and scheduled to be carried out on another day are scheduled to be carried out. In the illustrated embodiment, the graphical tool 440 includes graphical elements 442 (e.g., "M"), 444 (e.g., "Tu"), 446 (e.g., "W"), 448 (e.g., "Th"), 450 (e.g., "F") and 452 (e.g., "Sa"), representing days of the week, wherein in the illustrated embodiment the current day, i.e., represented by indication 424 ("Today"), is Sunday. Graphical element 442 (e.g., "M") may be activated to request display of a chronologic order in which scheduled actions associated with the specific device (e.g., identified by the name or identifier "Desk Lamp") and scheduled to be carried out on Monday are scheduled to be carried out. In at least some embodiments, the mobile computing device 300 may respond to the request, at least in part, by identifying a portion of the previously generated chronological ordering that is scheduled to be carried out on Monday, and generating a view that includes and/or is based at least in part on such portion of the generated chronological ordering. Graphical element 444 (e.g., "Tu") may be activated to request display of a chronologic order in which scheduled actions associated with the specific device (e.g., identified by the name or identifier "Desk Lamp") and scheduled to be carried out on Tuesday are scheduled to be carried out. In at least some embodiments, the mobile computing device 300 may respond to the request, at least in part, by identifying a portion of the previously generated chronological ordering that is scheduled to be carried out on Tuesday, and generating a view that includes and/or is based at least in part on such portion of the generated chronological ordering. Graphical elements 446, 448, 450 and 452 may be activated and responded to by the computing device 300 in a similar manner. It should be understood, though, that in other embodiments, the graphical tool 440, or another graphical tool, may include graphical elements other than days of the week, so that the user may activate the computing device 300 to convey a different chronological order or portion of a chronological order of scheduled actions.

In at least some embodiments, the view 420 may include one or more graphical tools that may be activated (e.g., by a finger tap) by a user to initiate navigation to a view that: (i) provides additional information in regard to one or more of the scheduled actions represented in the chronological ordering 422, (ii) allows the user to edit one or more of the scheduled actions, (iii) provides additional information in regard to one or more of the devices to be controlled by one or more of the scheduled actions and/or (iv) allows the user to control one or more of the devices, e.g., in real time or near real time and without the need to schedule an action. In at least some embodiments, each entry, e.g., entries 430-436, in the chronological ordering 422 may include such a graphical tool and may be used to initiate such drill down navigation. For example, in at least some embodiments, entry 430 may include a graphical tool that may be activated (e.g., by a finger tap) by a user to request a view that includes further information in regard to the scheduled action represented by entry 430. The latter view (not shown) may itself include one or more graphical tools (not shown) that may be activated (e.g., by a finger tap) by a user to request a view that includes further information in regard to the scheduled action and/or the specific device to be controlled by the scheduled action. Other drill down embodiments should be understood by those of ordinary skill in the art.

In at least some embodiments, the view 420 itself may further include additional information, e.g., information 480, e.g., in regard to the specific device, and/or graphical tools, e.g., graphical tools 490, that may be activated (e.g., by a finger tap) by a user to request that one or more action be carried out on the specific device in "real time" or near real time. In the illustrated embodiment, information 480 indicates how much power is being drawn by the specific device (60 Watts in the illustrated embodiment), a measure of average daily usage of the specific device (e.g., an average amount of time that the specific device is turned on per day) and/or an estimate of cost that is incurred to operate the specific device given such usage. In the illustrated embodiment, one or more of the graphical tools 490 may be activated (e.g., by a finger tap) by a user to request that power to the specific device be turn on or turned off and/or that a nightlight mode of the specific device, e.g., reduced power, be turned on or turned off.

The view 420 may include a graphical tool, e.g., graphical tool 460, that may be activated (e.g., by a finger tap) by a user to initiate a process that allows the user to schedule or otherwise define actions, e.g., add additional actions, revise existing actions, delete existing actions, etc. The view 420 may further include a graphical tool, e.g., graphical tool 470, which may be activated (e.g., by a finger tap) by a user to navigate to a prior or other view in the graphical user interface.

In at least some embodiments, it may be desirable to show a user what a scheduled scene will look like in a chronological ordering. In at least some embodiments, it may be desirable to show such immediately after the user has scheduled or otherwise defined the scheduled scene.

Figure 5:
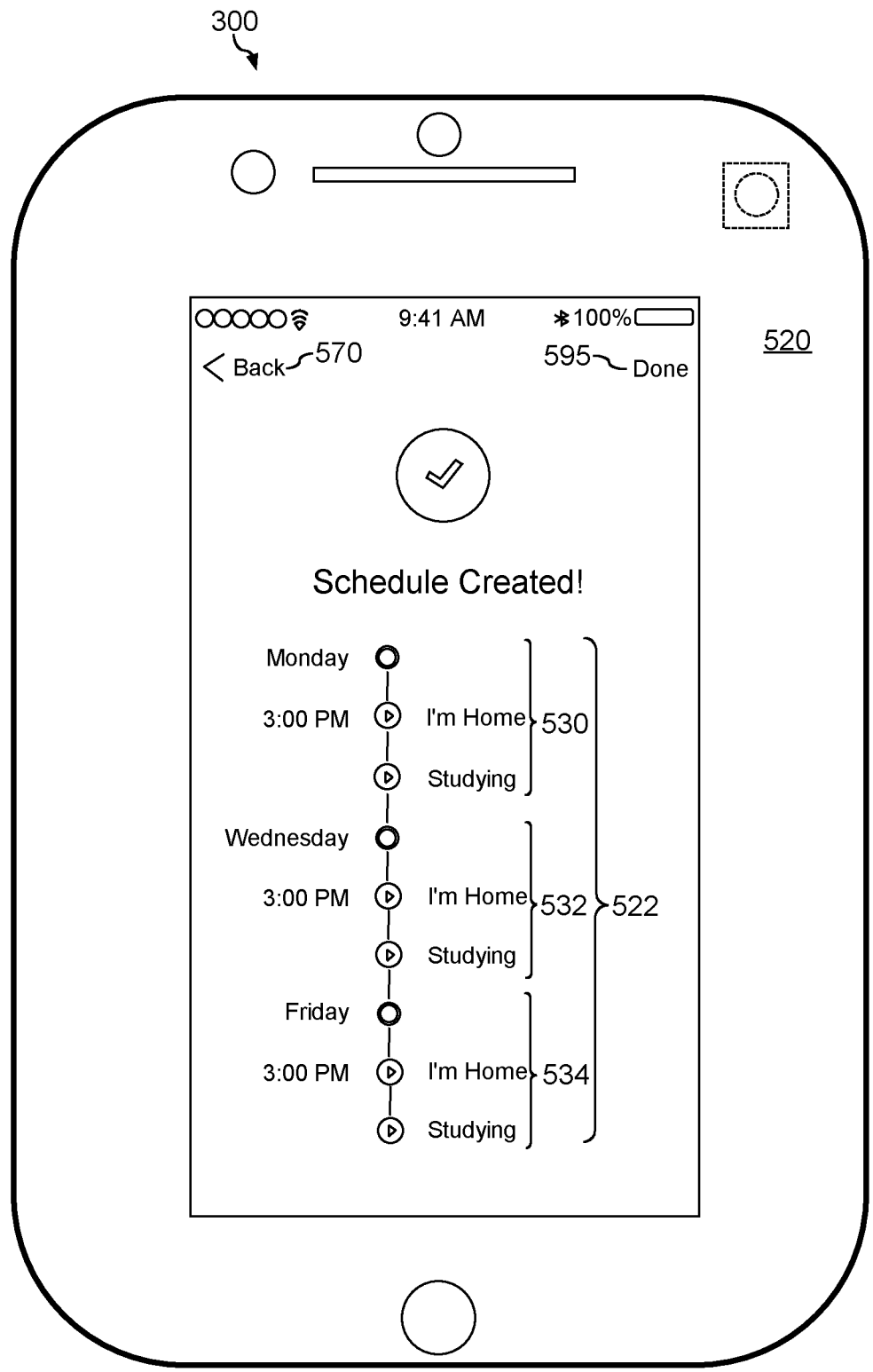
FIG. 5 is a schematic representation of the computing device of FIG. 3 displaying another view in a graphical user interface.

FIG. 5 shows the mobile computing device 300 displaying a view 520 that shows what a particular scheduled scene (which in the illustrated embodiment includes two scenes) may look like in a chronological ordering. In accordance with at least some embodiments, the view 520 may be displayed in response, at least in part, to a user completing the definition of the scheduled scene. Referring to FIG. 5, in accordance with at least some embodiments, the view 520 includes a chronological ordering 522. The chronological ordering 522 may include a plurality of entries, e.g., entries 530-534. In the illustrated embodiment, a first entry 530 indicates that two scenes, a scene named or otherwise associated with the identifier "I'M HOME" and a scene named or otherwise associated with the identifier "STUDY- ING," are scheduled to be carried out (or a portion thereof) at 3:00 PM on Monday. A second entry 532 indicates that the two scenes (or a portion thereof) are also scheduled to be carried out at 3:00 PM on Wednesday. A third entry 534 indicates that the two scenes (or a portion thereof) are also scheduled to be carried out at 3:00 PM on Friday. It should be understood that, though the illustrated embodiment depicts the scene(s) being carried out at the same time on particular days, the scenes may be scheduled to be carried out at any times and/or days defined by a user.

The view 520 may include a graphical tool, e.g., graphical tool 570, which may be activated (e.g., by a finger tap) by a user to navigate to a prior or other view in the graphical user interface. The view 520 may further include a graphical tool, e.g., graphical tool 595, which may be activated (e.g., by a finger tap) by a user to indicate that the user is done scheduling the scene(s) and/or viewing the chronologic order of the scene(s).

In at least some embodiments, it may be desirable to show a user what a schedule for a device will look like in a chronological ordering. In at least some embodiments, it may be desirable to show such immediately after the user has scheduled the device.

Figure 6:
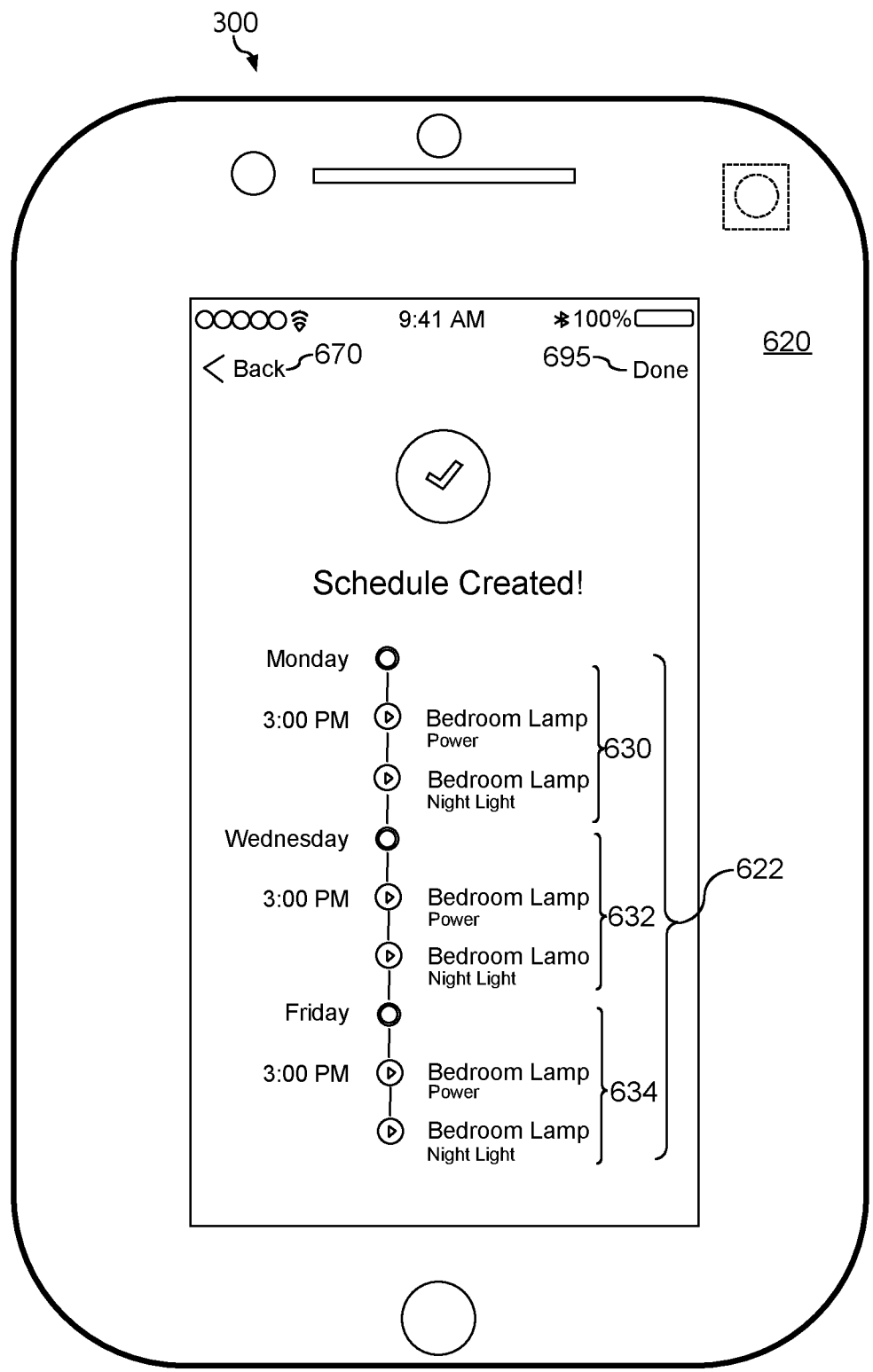
FIG. 6 is a schematic representation of the computing device of FIG. 3 displaying another view in a graphical user interface.

FIG. 6 shows the mobile computing device 300 displaying a view 620 that shows what a schedule for a device may look like in a chronological ordering. In accordance with at least some embodiments, the view 620 may be displayed in response, at least in part, to a user completing the definition of the schedule.

Referring to FIG. 6, in accordance with at least some embodiments, the view 620 includes a chronological ordering 622. The chronological ordering 622 may include a plurality of entries, e.g., entries 630-634. In the illustrated embodiments, a first entry 630 indicates that two actions, "Bedroom Lamp POWER ON" and "Bedroom Lamp Night Light OFF," are scheduled to be carried out at 3:00 PM on Monday. A second entry 632 indicates that the two actions are also scheduled to be carried out at 3:00 PM on Wednesday. A third entry 634 indicates that the two actions are also scheduled to be carried out at 3:00 PM on Friday. It should be understood that, though the illustrated embodiment depicts the actions being carried out at the same time on particular days, the scenes may be scheduled to be carried out at any times and/or days defined by a user.

The view 620 may include a graphical tool, e.g., graphical tool 670, which may be activated (e.g., by a finger tap) by a user to navigate to a prior or other view in the graphical user interface. The view 620 may further include a graphical tool, e.g., graphical tool 695, which may be activated (e.g., by a finger tap) by a user to indicate that the user is done scheduling the device and/or viewing the chronologic order of the actions.

Figure 7:
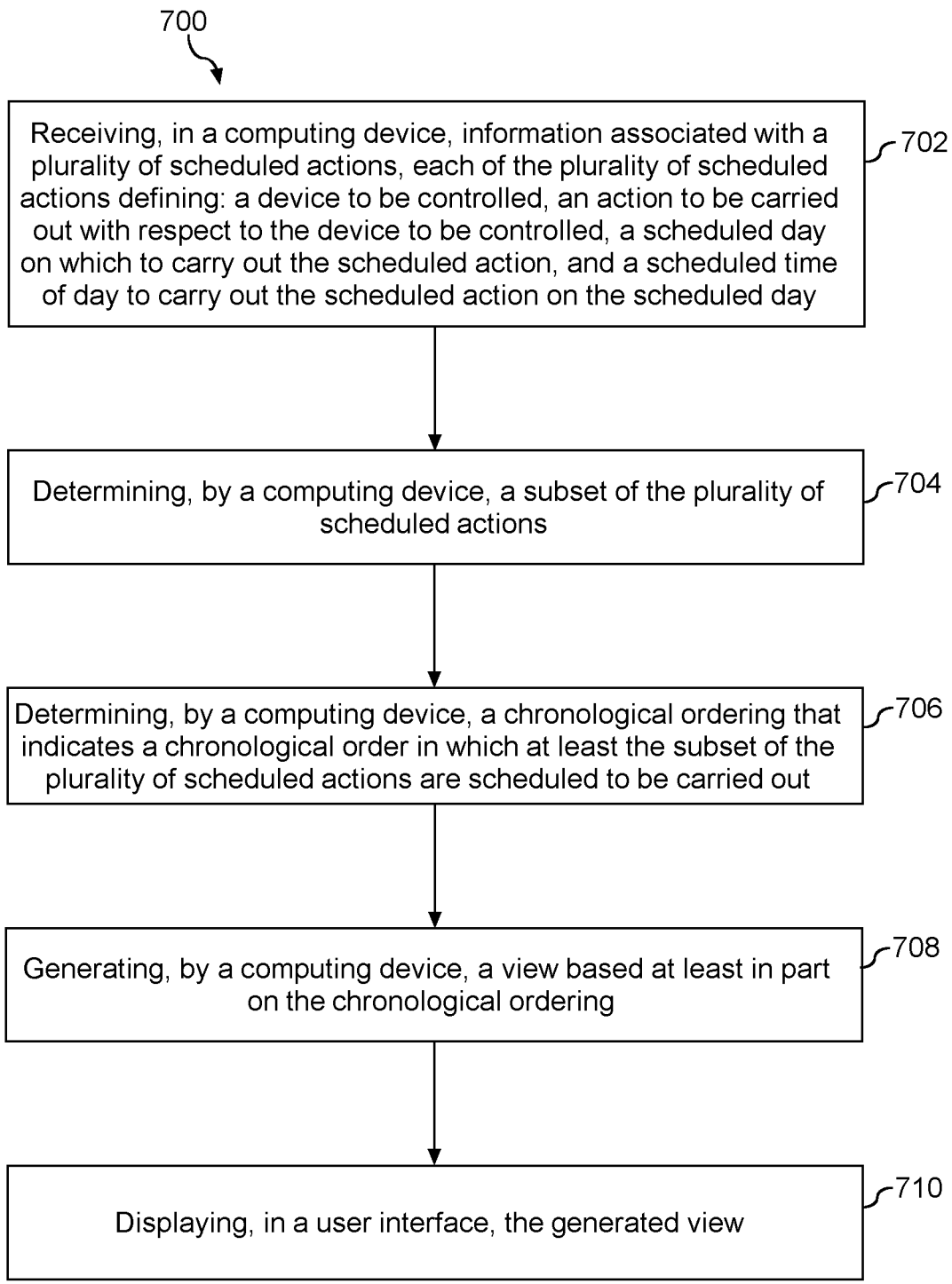
FIG. 7 is a flowchart of a method that may be used in providing a view in a graphical user interface.

FIG. 7 is a flowchart of a method 700 in accordance with at least some embodiments. In at least some embodiments, a method, or one or more portions thereof, may be used in generating a view to be displayed to a user or other entity. In at least some embodiments, the view may be a view in a user interface configured for use in control, by a computing device, of devices separate from the computing device. In at least some embodiments, the view may be similar to one or more of the views disclosed herein. In at least some embodiments, the method 700 may be used in providing the view 320 in FIG. 3, the view 420 in FIGS. 4A-4C, the view 520 in FIG. 5 and/or the view 620 in FIG. 6. In at least some embodiments, the method 700 may be used to provide a user with information from which a user can easily recognize a chronological order in which actions are scheduled to be carried out. In at least some embodiments, the method 700, or one or more portions thereof, (and/or any other method disclosed herein), may be performed in generating and displaying by one or more computing devices, e.g., computing devices 118₁-118ₚ, 300, and/or other device(s) disclosed herein.

The method is not limited to the order presented. Rather, in other embodiments, the steps may be performed in any order that is practicable. For that matter, unless stated otherwise, any steps disclosed herein may be performed in any order that is practicable, as may be desired by a user. In at least some embodiments, one or more portions of the method may be performed without one or more other portions of the method. In at least some embodiments, one or more portions of the method (and/or any other method disclosed herein) may be performed in combination with one or more other methods and/or portions thereof.

At 702, the method may include receiving, in a computing device, information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day. In accordance with at least some embodiments, the information may have and be stored in any suitable form(s) and may be received from any source(s).

At 704, the method may further include determining, by a computing device, a subset of the plurality of scheduled actions.

At 706, the method may further include determining, by a computing device, a chronological ordering that indicates a chronological order of at least the subset of the plurality of scheduled actions.

At 708, the method may further include generating, by a computing device, a view based at least in part on the chronological ordering, the view including at least a portion of the subset of the plurality of scheduled actions.

At 710, the method may further include displaying or conveying, via a user interface, e.g. a graphical user interface, the generated view. In other embodiments, the chronological ordering by be conveyed to a user, alternatively or additional to via a graphical user interface, via another user interface, such as audibly, e.g., via a speaker, or any other suitable user interface.

Unless stated otherwise, the term "controlled" means "directly controlled" and/or "indirectly controlled." Thus, a device that is to be controlled may be "directly controlled" and/or "indirectly controlled."

In at least some embodiments, the following method may be carried out by the mobile computing device 300 (and/or any other device(s)) in generating a view that includes a home schedule or other schedule associated with a home or other building. In at least some embodiments, the computing device may carry out the method by executing the iDevices Connected® application produced by iDevices of Avon, Conn. The mobile computing device 300 may request or otherwise receive all scheduled actions that were created and/or stored using a HomeKit® framework and are associated, for example, with the user's home or other building. The mobile computing device 300 may further request or otherwise receive all scheduled actions that were created independently of the HomeKit® framework and stored on a device that is to be controlled and associated, for example, with the user's home or other building. The mobile computing device 300 may thereafter determine which of the received scheduled actions is scheduled to be carried out first chronologically, on a current day. The mobile computing device 300 may write or otherwise provide an entry representing such scheduled action in a first field of a "Today" view associated with the current day. If the scheduled action is a scheduled scene, the entry may include (for display) the scheduled time and an icon associated with the scene (i.e., a scene icon). If one or more other scene is scheduled to be carried out at the scheduled time, the entry may further include an indication of the total number of scenes that are scheduled to be carried out at that scheduled time. If on the other hand, no other scene is scheduled to be carried out at the scheduled time, the entry may instead further include a name or other identifier associated with the only scene scheduled to be carried out at the scheduled time. In the case that the scheduled action is not a scheduled scene, the entry may include the scheduled time and an icon associated with the scheduled action (e.g., an icon showing or otherwise representing the scheduled action) and a name or other identifier associated with the device to be controlled and a service it is controlling. The mobile computing device 300 may thereafter determine which of the received scheduled actions is scheduled to be carried out next chronologically, on the current day. The mobile computing device 300 may write or otherwise provide an entry representing such scheduled action in a second field of the "Today" view. The entry for such scheduled action that is scheduled to be carried out next chronologically may be defined in the same manner as described above for the scheduled action that is scheduled to be carried out chronologically first. The method may be repeated until all scheduled actions scheduled to be carried out on the current day have been represented in the "Today" view. The mobile computing device 300 may repeat the method for the next day and so on until all scheduled actions on all days have been represented in the appropriate view.

In at least some embodiments, the following method may be carried out by the mobile computing device 300 (and/or any other device(s)) in generating a view that includes a product schedule for a specific device to be controlled. In at least some embodiments, the computing device may carry out the method by executing the iDevices Connected® application produced by iDevices of Avon, Conn. The mobile computing device 300 may request or otherwise receive all scheduled actions that were created and/or stored using a HomeKit® framework and are associated with the specific device. The mobile computing device 300 may further request or otherwise receive all scheduled actions that were created independently of the HomeKit® framework and stored on the specific device to be controlled. The mobile computing device 300 may thereafter determine which of the received scheduled actions is scheduled to be carried out first chronologically, on a current day. The mobile computing device 300 may write or otherwise provide an entry representing such scheduled action in a first field of a "Today" view associated with the current day. If the scheduled action is a scheduled scene, the entry may include (for display) the scheduled time and an icon associated with the scene (i.e., a scene icon). If one or more other scene is scheduled to be carried out at the scheduled time, the entry may further include an indication of the total number of scenes that are scheduled to be carried out at that scheduled time. If on the other hand, no other scene is scheduled to be carried out at the scheduled time, the entry may instead further include a name or other identifier associated with the only scene scheduled to be carried out at the scheduled time. In the case that the scheduled action is not a scheduled scene, the entry may include the scheduled time and an icon associated with the scheduled action (e.g., an icon showing or otherwise representing the scheduled action) and a name or other identifier associated with the device to be controlled and a service it is controlling. The mobile computing device 300 may thereafter determine which of the received scheduled actions is scheduled to be carried out next chronologically, on the current day. The mobile computing device 300 may write or otherwise provide an entry representing such scheduled action in a second field of the "Today" view. The entry for such scheduled action that is scheduled to be carried out next chronologically may be defined in the same manner as described above for the scheduled action that is scheduled to be carried out chronologically first. The method may be repeated until all scheduled actions scheduled to be carried out on the current day have been represented in the "Today" view. The mobile computing device 300 may repeat the method for the next day and so on until all scheduled actions on all days have been represented in the appropriate view.

In embodiments where an icon (or image) is used to represent, identify or otherwise is associated with a building, location, site, floor room, device, scene or action, such icon may be customized or otherwise selected or created by a user. Such is disclosed in and may be implemented in according with U.S. patent application Ser. No. 15/625,663, filed Jun. 16, 2017, entitled "Application Icon Customization," which claims priority to U.S. Provisional Patent Application Ser. No. 62/352,009, filed Jun. 19, 2016, and to U.S. Provisional Patent Application Ser. No. 62/396,204, filed Sep. 18, 2016 each of which is hereby expressly incorporated by reference in its entirety as part of the present disclosure.

Figure 8:
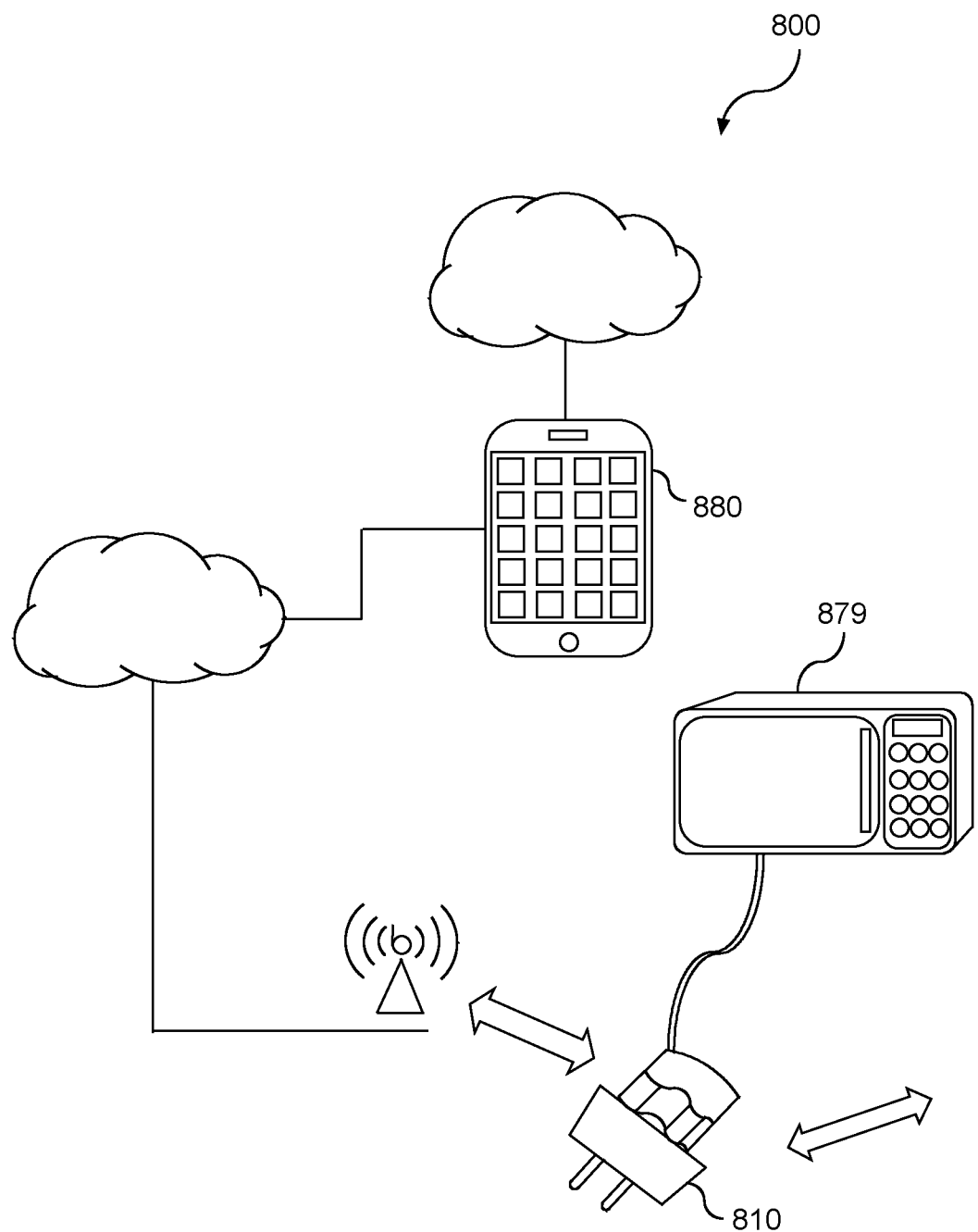
FIG. 8 is a schematic diagram of a system that includes a power switching device, a corded device, and a IOT connected computing device.

FIG. 8 is a schematic diagram of a system 800 that includes direct and indirect control of devices, in accordance with at least some embodiments. Referring to FIG. 8, the system 800 includes a power-switching device 810, a corded device 879, and an Internet of Things (IoT) connected computing device 880. The power-switching device 810 is configured to be plugged into or otherwise receive electric power from an electrical source, e.g., an AC output such as an electrical socket or receptacle. The corded device 879 is plugged into the power switching device 810. The computing device 880 is communicatively coupled to the power switching device 810, which the computing device 880 uses to control the operation (e.g., on/off) of the corded device 879. As such, the power-switching device 810 and the corded device 879 are each configured to be controlled by the computing device 880. The power-switching device 810 is, in the illustrated embodiment, directly controlled by the computing device 880. The corded device 879 is indirectly controlled by the computing device 880 via the power-switching device 810. It should be understood, that control (direct and/or indirect) is not limited to the control illustrated in FIG. 8.

In at least some embodiments, the control of one or more features and/or functions of a device to be controlled may be implemented in accordance with one or more aspects of one or more embodiments of any of the following co-pending patent applications, each of which is hereby expressly incorporated by reference in its entirety as part of the present disclosure: U.S. patent application Ser. No. 14/823,732, filed Aug. 11, 2015, entitled "Multifunction Pass-Through Wall Power Plug with Communication Relay and Related Method," published as U.S. Patent Application Publication No. 2016/0044447 A1 on Feb. 11, 2016, which claims priority to U.S. Provisional Application No. 61/999,914, filed Aug. 11, 2014; U.S. patent application Ser. No. 14/988,590, filed Jan. 5, 2016, entitled "IOT Communication Bridging Power Switch," published as U.S. Patent Application Publication No. 2016/0209899 A1 on Jul. 21, 2016, which claims priority to U.S. Provisional Application No. 62/100,000, filed Jan. 5, 2015; and U.S. patent application Ser. No. 15/625,663, filed Jun. 16, 2017, entitled "Application Icon Customization," which claims priority to U.S. Provisional Patent Application Ser. No. 62/352,009, filed Jun. 19, 2016, and to U.S. Provisional Patent Application Ser. No. 62/396,204, filed Sep. 18, 2016 each of which is hereby expressly incorporated by reference in its entirety as part of the present disclosure.

In at least some embodiments, one or more features and/or functions of a computing device for controlling a device may be implemented in accordance with one or more aspects of one or more embodiments of any of the above-cited co-pending patent applications. Thus, for example, in at least some embodiments, the power switching device 810, the corded device 879 and/or the connected computing device 880 may be the same as and/or similar to the power switching device 10, the power corded device 79 and/or the computing device 80, respectively, disclosed in U.S. patent application Ser. No. 14/988,590, filed Jan. 5, 2016, entitled "IOT Communication Bridging Power Switch," published as U.S. Patent Application Publication No. 2016/0209899 A1 on Jul. 21, 2016, which claims priority to U.S. Provisional Application No. 62/100,000, filed Jan. 5, 2015, each of which is hereby expressly incorporated by reference in its entirety as part of the present disclosure. In at least some embodiments, one or more of the devices disclosed herein may comprise a device produced by iDevices of Avon, Conn.

Figure 9:
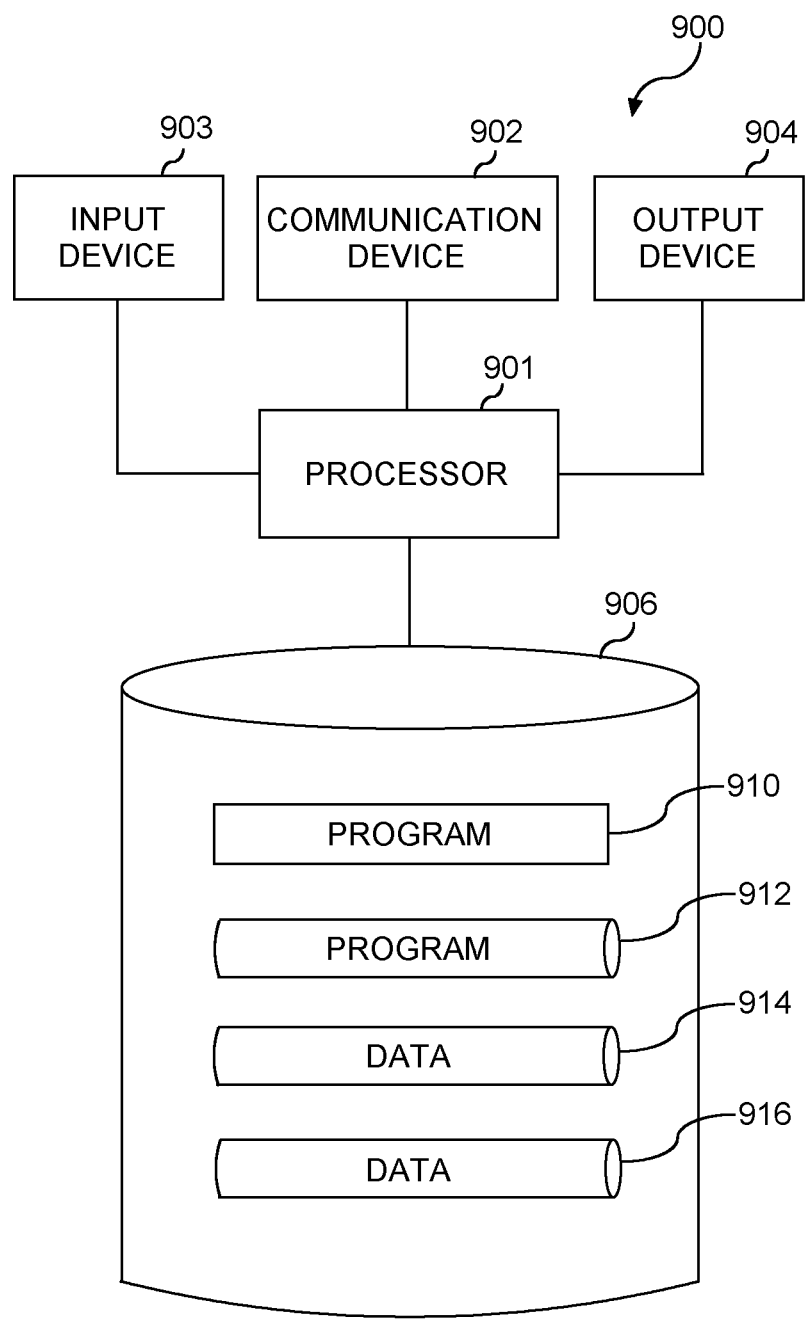
FIG. 9 is a block diagram of a system architecture.

FIG. 9 is a block diagram of an architecture 900 according to some embodiments. In at least some embodiments, one or more of the systems (or portion(s) thereof), apparatus (or portion(s) thereof) and/or devices (or portion(s) thereof) disclosed herein may have an architecture that is the same as and/or similar to one or more portions of the architecture 900. In at least some embodiments, one or more of the methods (or portion(s) thereof) disclosed herein may be performed by a system, apparatus and/or device having an architecture that is the same as or similar to the architecture 900 (or portion(s) thereof). The architecture may be implemented as a distributed architecture or a non-distributed architecture. A distributed architecture may be a completely distributed architecture or a partly distributed-partly non-distributed architecture.

Referring to FIG. 9, in accordance with at least some embodiments, the architecture 900 includes a processor 901 operatively coupled to a communication device 902, an input device 903, an output device 904 and a storage device 906, each of which may be distributed or non-distributed.

In at least some embodiments, the processor 901 may execute processor-executable program code to provide one or more portions of the one or more embodiments disclosed herein and/or to carry out one or more portions of one or more embodiments of one or more methods disclosed herein. In at least some embodiments, the processor 901 may include one or more microprocessors, such as, for example, one or more "general-purpose" microprocessors, one or more special-purpose microprocessors and/or application specific integrated circuits (ASICS), or some combination thereof. In at least some embodiments, the processor 901 may include one or more reduced instruction set (RISC) processors.

The communication device 902 may be used to facilitate communication with other devices and/or systems. In at least some embodiments, communication device 902 may be configured with hardware suitable to physically interface with one or more external devices and/or network connections. For example, communication device 902 may comprise an Ethernet connection to a local area network through which architecture 900 may receive and transmit information over the Internet and/or one or more other network(s). In other embodiments, the communication device 902 includes hardware e.g., a wireless transceiver, to wirelessly communicate with external devices and/or network connections. The wireless transceiver may be capable of wireless communication utilizing one or more existing wireless systems or protocols, e.g., WiFi, Bluetooth, BLE (Bluetooth Low Energy), etc., or yet-to-be-developed systems or protocols.

The input device 903 may comprise, for example, one or more devices used to input data and/or other information, such as, for example, but not limited to: a keyboard, a keypad, track ball, touchpad, a mouse or other pointing device, a microphone, knob or a switch, an infrared (IR) port, etc. The output device 904 may comprise, for example, but not limited to, one or more devices used to output data and/or other information, such as, for example: an IR port, a display, a speaker, and/or a printer, etc. In at least some embodiments, the input device 903 and/or output device 904 define a user interface, which may enable an operator to input data and/or other information and/or to view output data and/or other information.

The storage device 906 may comprise, for example, one or more storage devices, such as, for example, but not limited to, magnetic storage devices (e.g., magnetic tape and hard disk drives), optical storage devices, and/or semiconductor memory devices such as Random Access Memory (RAM) devices and Read Only Memory (ROM) devices, solid state memory devices, or any suitable volatile or non-volatile memory devices as should be appreciated by those of ordinary skill in the art. The storage device 906 may store one or more programs 910, 912 and/or other information for operation of the architecture 900. In at least some embodiments, the one or more programs 910, 912 include one or more instructions to be executed by the processor 901 to provide one or more portions of one or more tasks and/or one or more portions of one or more methods disclosed herein. In at least some embodiments, the one or more programs 910, 912 include one or more operating systems, database management systems, other applications, other information files, etc., for operation of the architecture 900. The storage device 906 may store one or more databases and/or other information 914, 916 for one or more programs. As used herein a "database" may refer to one or more related or unrelated databases. Data and/or other information may be stored in any form. In at least some embodiments, data and/or other information may be stored in raw, excerpted, summarized and/or analyzed form.

In at least some embodiments, the architecture 900 may comprise (and/or be based at least in part on) an iOS operating system, an android operating system, and/or any other suitable operating system and/or platform, as those skilled in the art will appreciate.

In at least some embodiments, one or more portions of one or more embodiments disclosed herein may be embodied in a method, an apparatus, a system, a computer program product, a non-transitory machine-readable storage medium with instructions stored thereon, and/or any combination thereof. In at least some embodiments, a machine comprises a processor.

It should be understood by those of ordinary skill in the art that a computer application or program may take the form of any suitable computer program, application, or computer readable medium (e.g., a non-transitory computer-readable medium) using any suitable language or protocol. A computer application may include, as should be recognized, any suitable interface to interface with a user and receive inputs from the user to provide instructions for the control of the remote device. Such exemplary input mechanisms include, but are not limited to, keyboard input, touchscreen input, and voice input. In at least some embodiments, the user interface is adapted to provide information to the user as to the identity and/or status of the device to be controlled. Exemplary interfaces include, but are not limited to, visual (e.g., a viewscreen or monitor) and auditory (e.g., voice and/or sound) delivery of such information.

It should also be understood that a computing device may be, but is not limited to, any suitable device or devices adapted to store, read and/or execute a program. A computer system may include, for example, without limitation, a mobile device, such as a mobile phone or smart phone, a desktop computer, a mainframe or server-based computer system, or Cloud-based computer system.

It should further be understood that that a computing device may transmit to and/or receive from a remotely-controlled device information and/or instructions by any suitable means, including wireless and wired communications and networks, and any combinations thereof. Such may include, by non-limiting example, WiFi, RF (radio frequency), Bluetooth, Bluetooth Low Energy, infrared, Internet, cellular, and Ethernet technologies and protocols.

It should be understood that the features disclosed herein can be used in any combination or configuration, and is not limited to the particular combinations or configurations expressly specified or illustrated herein. Thus, in at least some embodiments, one or more of the features disclosed herein may be used without one or more other features disclosed herein. In at least some embodiments, each of the features disclosed herein may be used without any one or more of the other features disclosed herein. In at least some embodiments, one or more of the features disclosed herein may be used in combination with one or more other features that is/are disclosed (herein) independently of said one or more of the features. In at least some embodiments, each of the features disclosed (herein) may be used in combination with any one or more other feature that is disclosed herein.

Unless stated otherwise, the term "represent" means "directly represent" and/or "indirectly represent." Unless stated otherwise, a graphical tool may include, but is not limited to, any type or types of graphical control elements. Unless stated otherwise, a computing device is any type of device that includes at least one processor. Unless stated otherwise, a mobile computing device includes, but is not limited to, any computing device that may be carried in one or two hands and/or worn. Mobile computing devices that may be carried in one or two hands include, but are not limited to, laptop computers (full-size or any other size), e-readers or other tablet computers (any size), a smart phone (or other type of mobile phone), a digital camera, a media player, a mobile game console, a portable data assistant and any combination thereof. Mobile computing devices that may be worn include, but are not limited to: (i) eyeglasses having a computing device, (ii) a head-mounted apparatus (headset, helmet or other head mounted apparatus) having a computing device, (iv) clothing having a computing device (v) any other computing device that may be worn on, in and/or supported by: (a) a portion of a body and/or (b) clothing.

Unless stated otherwise, a processor may comprise any type of processor. For example, a processor may be programmable or non-programmable, general purpose or special purpose, dedicated or non-dedicated, distributed or non-distributed, shared or not shared, and/or any combination thereof. A processor may include, but is not limited to, hardware, software (e.g., low-level language code, high-level language code, microcode), firmware, and/or any combination thereof. Hardware may include, but is not limited to off-the-shelf integrated circuits, custom integrated circuits and/or any combination thereof. In at least some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link. Unless stated otherwise, the term "processor" should be understood to include one processor or two or more cooperating processors. Unless stated otherwise, the term "memory" should be understood to encompass a single memory or storage device or two or more memories or storage devices. Unless stated otherwise, a processing system is any type of system that includes at least one processor. Unless stated otherwise, a processing device is any type of device that includes at least one processor. Unless stated otherwise, "code" may include, but is not limited to, instructions in a high-level language, low-level language, machine language and/or other type of language or combination thereof. Unless stated otherwise, a program may include, but is not limited to, instructions in a high-level language, low-level language, machine language and/or other type of language or combination thereof. Unless stated otherwise, an application is any type of program. Unless stated otherwise, a "communication link" may comprise any type(s) of communication link(s), for example, but not limited to, wired links (e.g., conductors, fiber optic cables) or wireless links (e.g., acoustic links, radio links, microwave links, satellite links, infrared links or other electromagnetic links) or any combination thereof, each of which may be public and/or private, dedicated and/or shared. In at least some embodiments, a communication link may employ a protocol or combination of protocols including, for example, but not limited to the Internet Protocol. Unless stated otherwise, information may include data and/or any other type of information (including, for example, but not limited to, one or more instructions to be executed by a processor), and may be in any form, for example, but not limited to, analog information and/or digital information in serial and/or in parallel form. Information may or may not be divided into blocks.

Unless stated otherwise, terms such as, for example, "in response to" and "based on" mean "in response (directly and/or indirectly) at least to" and "based (directly and/or indirectly) at least on," respectively, so as not to preclude intermediates and being responsive to and/or based on, more than one thing. Also, unless stated otherwise, the phrase "a first" does not, by itself, require that there also be a "second." Also, unless stated otherwise, terms such as, for example, "in response to" and "based on" mean "in response at least to" and "based at least on," respectively, so as not to preclude being responsive to and/or based on, more than one thing. Unless stated otherwise, terms such as, for example, "comprises," "has," "includes," and all forms thereof, are considered open-ended, so as not to preclude additional elements and/or features. Also, unless stated otherwise, terms such as, for example, "a," "one," "first," are considered open-ended, and do not mean "only a," "only one" and "only a first," respectively. Also unless stated otherwise, the term "first" does not, by itself, require that there also be a "second."

Also, unless stated otherwise, the phrase "A and/or B" means the following combinations: (i) A but not B, (ii) B but not A, (iii) A and B. It should be recognized that the meaning of any phrase that includes the term "and/or" can be determined based on the above. For example, the phrase "A, B and/or C" means the following combinations: (i) A but not B and not C, (ii) B but not A and not C, (iii) C but not A and not B, (iv) A and B but not C, (v) A and C but not B, (vi) B and C but not A, (vii) A and B and C. Further combinations using and/or shall be similarly construed.

As may be recognized by those of ordinary skill in the pertinent art based on the teachings herein, numerous changes and modifications may be made to the above-described and other embodiments without departing from the spirit and/or scope of the invention. By way of example only, the disclosure contemplates, but is not limited to, embodiments having any one or more of the features (in any combination or combinations set forth in the above description). Accordingly, this detailed description of embodiments is to be taken in an illustrative as opposed to a limiting sense.

What is claimed is:

1. A method comprising:
receiving, in one or more computing devices, information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day;
determining, by the one or more computing devices, a chronological ordering that indicates a chronological order in which at least a subset of the plurality of scheduled actions are scheduled to be carried out;
determining, by the one or more computing devices, two or more scheduled actions included in the subset are scheduled to be carried out at the same time on the same day;
generating, by the one or more computing devices, a view based at least in part on the chronological ordering, the view including a single entry to represent the two or more scheduled actions scheduled to be carried out at the same time on the same day; and
displaying, in a user interface, the generated view,
wherein the view further includes operating information associated with the device to be controlled.

2. The method of claim 1, wherein each one of the plurality of scheduled actions in the subset is represented by an entry in the chronological ordering that is located at a position in the chronological ordering that is based at least in part on the scheduled time of day defined by the one of the plurality of scheduled actions.

3. The method of claim 1, wherein the subset includes each of the plurality of scheduled actions that are scheduled to be carried out on a current day.

4. The method of claim 3, wherein the view indicates a chronologic order of scheduled actions included in said subset.

5. The method of claim 4, wherein the view includes a graphical tool activatable by a user to request display of said chronologic order.

6. A non-transitory computer-readable medium having computer-readable instructions stored thereon that if executed by a computing system, perform a method comprising:
receiving, in one or more computing devices, information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day;
determining, by the one or more computing devices, a chronological ordering that indicates a chronological order in which at least a subset of the plurality of scheduled actions are scheduled to be carried out;
determining, by the one or more computing devices, two or more scheduled actions included in the subset are scheduled to be carried out at the same time on the same day;
generating, by the one or more computing devices, a view based at least in part on the chronological ordering, the view including a single entry to represent the two or more scheduled actions to be carried out at the same time on the same day; and
displaying, in a user interface, the generated view,
wherein the view further includes operating information associated with the device to be controlled.

7. The medium of claim 6, wherein each one of the plurality of scheduled actions in the subset is represented by an entry in the chronological ordering that is located at a position in the chronological ordering that is based at least in part on the scheduled time of day defined by the one of the plurality of scheduled actions.

8. The medium of claim 6, wherein the subset includes each of the plurality of scheduled actions that are scheduled to be carried out on a current day.

9. The medium of claim 8, wherein the view indicates a chronologic order of scheduled actions included in said subset.

10. The medium of claim 9, wherein the view includes a graphical tool activatable by a user to request display of said chronologic order.

11. A computing device, comprising:
one or more processors; and
one or more memory device storing computer-readable instructions that, when executed by the one or more processors, cause the one or more processors to performs operations, the operations comprising:
receiving information associated with a plurality of scheduled actions, each of the plurality of scheduled actions defining a device to be controlled, an action to be carried out with respect to the device to be controlled, a scheduled day on which to carry out the scheduled action and a scheduled time of day to carry out the scheduled action on the scheduled day;
determining a chronological ordering that indicates a chronological order in which at least a subset of the plurality of scheduled actions are scheduled to be carried out;
determining two or more scheduled actions included in the subset are scheduled to be carried out at the same time on the same day;
generating a view based at least in part on the chronological ordering, the view including a single entry to represent the two or more scheduled actions to be carried out at the same time on the same day; and displaying the generated view,
wherein the view further includes operating information associated with the device to be controlled.

12. The computing device of claim 11, wherein each one of the plurality of scheduled actions in the subset is represented by an entry in the chronological ordering that is located at a position in the chronological ordering that is based at least in part on the scheduled time of day defined by the one of the plurality of scheduled actions.

13. The computing device of claim 11, wherein the subset includes each of the plurality of scheduled actions that are scheduled to be carried out on a current day.

14. The computing device of claim 13, wherein the view indicates a chronologic order of scheduled actions included in said subset.

15. The computing device of claim 14, wherein the view includes a graphical tool activatable by a user to request display of said chronologic order.

16. The method of claim 1, wherein the operating information includes one or more selected from the group consisting of an amount of power drawn by the device to be controlled, an average daily usage of the device to be controlled, and an estimate of a cost that is incurred to operate the device to be controlled.

17. The medium of claim 6, wherein the operating information includes one or more selected from the group consisting of an amount of power drawn by the device to be controlled, an average daily usage of the device to be controlled, and an estimate of a cost that is incurred to operate the device to be controlled.

18. The computing device of claim 11, wherein the operating information includes one or more selected from the group consisting of an amount of power drawn by the device to be controlled, an average daily usage of the device to be controlled, and an estimate of a cost that is incurred to operate the device to be controlled.

* * * * *